(12) United States Patent
Tewari et al.

(10) Patent No.: US 8,176,884 B2
(45) Date of Patent: May 15, 2012

(54) ENHANCED OXYGEN PRESSURE ENGINE

(75) Inventors: Asim Tewari, Bangalore (IN); Karthik Ramanathan, Bangalore (IN); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 877 days.

(21) Appl. No.: 12/121,871

(22) Filed: May 16, 2008

(65) Prior Publication Data

US 2009/0283059 A1    Nov. 19, 2009

(51) Int. Cl.
*F02B 43/08* (2006.01)
*F02B 23/00* (2006.01)

(52) U.S. Cl. ............................................ 123/3; 123/585
(58) Field of Classification Search ....... 123/3, 585–588
See application file for complete search history.

(56) References Cited

U.S. PATENT DOCUMENTS

| | | | |
|---|---|---|---|
| 2,062,859 A | 12/1936 | Bowden | |
| 4,064,840 A | 12/1977 | Vierling | |
| 4,798,661 A * | 1/1989 | Meyer | 204/229.5 |
| 5,649,517 A | 7/1997 | Poola et al. | |
| 5,908,023 A | 6/1999 | Stutzenberger | |
| 6,055,808 A | 5/2000 | Poola et al. | |
| 6,067,973 A * | 5/2000 | Chanda et al. | 123/585 |
| 6,106,963 A * | 8/2000 | Nitta et al. | 429/513 |
| RE37,269 E * | 7/2001 | Yamaguchi et al. | 123/308 |
| 6,352,068 B1 * | 3/2002 | Jacobsen | 123/585 |
| 6,363,923 B1 | 4/2002 | Pletschacher | |
| 6,543,428 B1 * | 4/2003 | Blandino et al. | 123/585 |
| 6,640,794 B2 | 11/2003 | Weber | |
| 6,641,643 B2 * | 11/2003 | Jensvold et al. | 95/45 |
| 6,722,352 B2 * | 4/2004 | Smolarek et al. | 123/585 |
| 6,742,379 B2 * | 6/2004 | Matsubara et al. | 73/1.06 |
| 6,742,507 B2 * | 6/2004 | Keefer et al. | 123/585 |
| 6,840,235 B2 * | 1/2005 | Koseki et al. | 123/568.14 |
| 7,117,669 B2 * | 10/2006 | Kaboord et al. | 60/288 |
| 7,128,064 B2 | 10/2006 | Heider | |
| 7,337,770 B2 * | 3/2008 | Moon | 123/585 |
| 7,377,272 B2 * | 5/2008 | Davidson | 123/585 |
| 7,387,091 B2 * | 6/2008 | Ritter | 123/27 GE |
| 7,543,577 B2 * | 6/2009 | Ha et al. | 123/585 |
| 7,879,205 B2 * | 2/2011 | Gil et al. | 204/228.3 |
| 2002/0134236 A1 * | 9/2002 | Jensvold et al. | 95/47 |
| 2007/0101975 A1 | 5/2007 | Moon | |
| 2007/0107676 A1 | 5/2007 | Davidson | |
| 2007/0227120 A1 * | 10/2007 | Yodice et al. | 60/274 |
| 2007/0266995 A1 * | 11/2007 | Ha et al. | 123/445 |
| 2008/0115773 A1 * | 5/2008 | Gaur et al. | 123/585 |
| 2009/0000586 A1 * | 1/2009 | Tonery | 123/184.47 |
| 2009/0076713 A1 * | 3/2009 | Bailey et al. | 701/103 |
| 2009/0250045 A1 * | 10/2009 | Liu | 123/585 |
| 2010/0224142 A1 * | 9/2010 | Iwamoto et al. | 123/3 |
| 2011/0094458 A1 * | 4/2011 | Dee et al. | 123/3 |

FOREIGN PATENT DOCUMENTS

| | | |
|---|---|---|
| DE | 4117829 A | 12/1992 |
| DE | 19710839 A | 9/1998 |
| GB | 2056310 A | 3/1981 |
| GB | 2342390 A | 4/2002 |
| JP | 2000130178 A | 5/2000 |

\* cited by examiner

*Primary Examiner* — Marguerite McMahon
*Assistant Examiner* — Tea Bajramovic

(57) ABSTRACT

Systems and methods of operation for internal combustion engines which employ molecular sieve technology to provide enhanced oxygen content in the air-fuel mixture during operation.

21 Claims, 1 Drawing Sheet

ENHANCED OXYGEN PRESSURE ENGINE

TECHNICAL FIELD

This disclosure is related generally to the operation of internal combustion ("IC") engines. More particularly, it relates to systems and methods for increasing the level of oxygen in the air admitted into such engines during their normal operation.

BACKGROUND

The statements in this section merely provide background information related to the present disclosure and may not constitute prior art.

IC engines have been in widespread use for over a century in various employments, owing to the convenience of their operation and the general availability of fuels upon which they depend. In addition to requiring a fuel, generally a hydrocarbon fuel, IC engines also require a source of oxygen for the fuel's combustion. Oxygen requirement for combustion of a fuel in an IC engine has come from the ambient air in the engine's surroundings, which air contains about 21% oxygen and about 78% nitrogen on a mass basis. Preferably, this air is filtered prior to being admitted into the combustion chambers of an IC engine, in order to remove dirt and debris which could otherwise have a detrimental effect on operability over the long term.

Many workers have sought over the years to increase performance and/or economy of operation of IC engines, by altering parameters associated with either or both the fuel requirement and the oxygen requirement. Many different fuels and additives including oxygenates and metal alkyls have been incorporated into fuels to enhance engine performance. On-board nitrous oxide tanks have been employed to provide enhanced combustion of fuel and greater performance. Other efforts relating to the non-fuel component of combustion included the creation and deployment of superchargers and turbochargers (hereinafter "forced induction"), for use in aviation. These systems survive to this day and may be found in diesel-driven equipment and performance-oriented automobiles.

SUMMARY

A system useful for operating an internal combustion engine includes an internal combustion engine having an intake manifold and an exhaust manifold, and an oxygen generator including molecular sieves as a functional component having an oxygen effluent therefrom directed to the intake manifold.

BRIEF DESCRIPTION OF THE DRAWINGS

One or more embodiments will now be described, by way of example, with reference to the accompanying drawings, in which.

DETAILED DESCRIPTION

Figure 1:
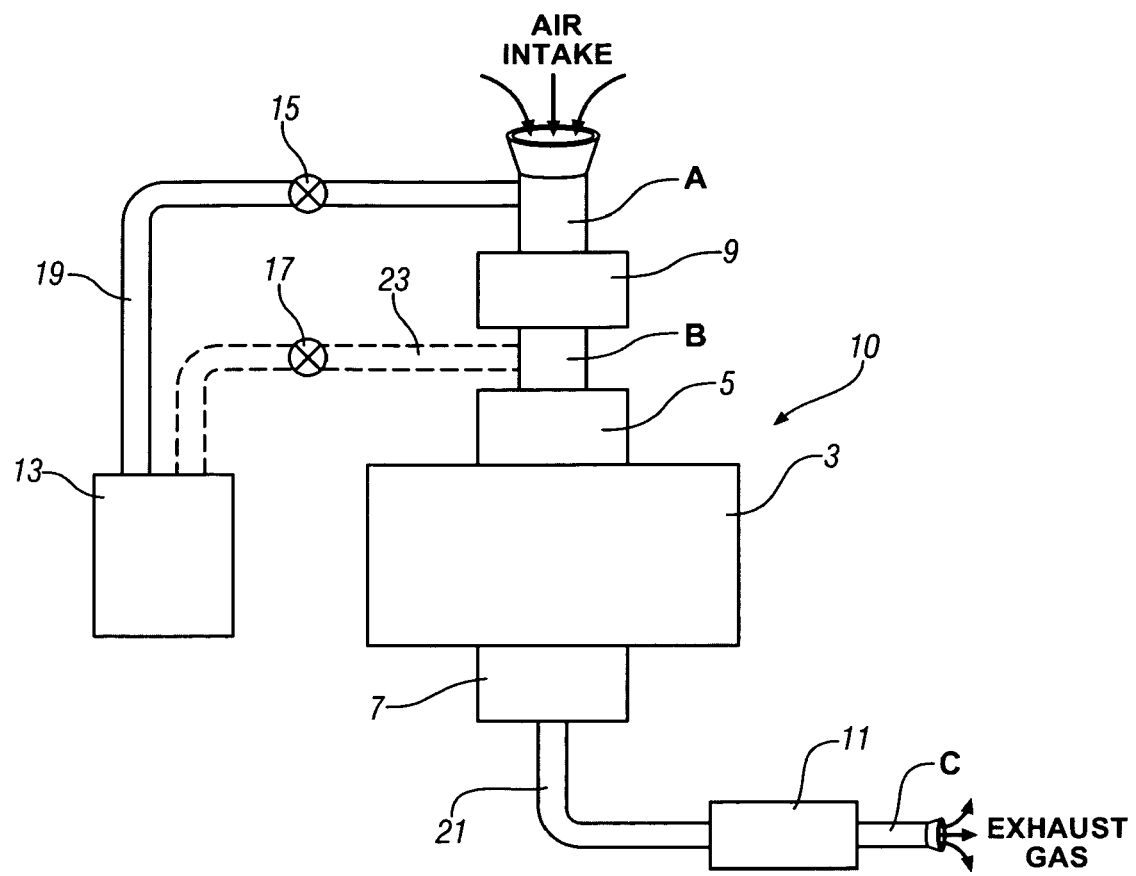
FIG. 1 shows a block schematic view of an IC engine system in accordance with the present disclosure.

Referring now to the drawings, wherein the showings are for the purpose of illustrating certain exemplary embodiments only and not for the purpose of limiting the same, FIG. 1 illustrates a block schematic view of an IC engine system 10 according to one embodiment of the present disclosure. IC engine 3 has an intake manifold 5 and an exhaust manifold 7. In one embodiment, the intake manifold 5 includes a throttle body for metering air. There is an air filter 9 for filtering air admitted to the IC engine 3. An exhaust gas aftertreatment device 11 (e.g. catalytic converter) is attached to the exhaust manifold by means of an exhaust conduit 21 attached to the exhaust manifold 7 for purposes of oxidizing both carbon monoxide and unburned hydrocarbons, and the reduction of nitrogen oxides prior to permitting the exhaust gases to escape into the surroundings. An oxygen generator 13 has an effluent conduit 19 through which air having oxygen levels in excess of that of normal atmospheric air. In one embodiment the effluent may be controllably delivered through a valve 15 to the air intake at point A Such provision enables controlled delivery of an air feed containing super-atmospheric levels of oxygen to the IC engine 3. In one alternate embodiment, the effluent of the oxygen generator 13 is delivered to the air-intake side of the IC engine at point B, through a valve 17, the effluent conduit 23 in this alternate embodiment being illustrated by the dashed lines in FIG. 1.

In preferred embodiments, the oxygen generator 13 employs one or more molecular sieves (including "zeolites", a.k.a. aluminosilicates) as a functional component in providing oxygen for use as described herein, in some embodiments by pressure swing adsorption. Known devices employing molecular sieves which are suitable for employment in this disclosure include, without limitation: Eclipse, Personal Ambulatory Oxygen System (PAOS) from SeQual Technologies, San Diego, Calif., USA; Perfecto2 Oxygen Concentrators by Invacare, Cleveland, Ohio, USA; EverFlo Oxygen Concentrators from Respironics, Murrysville, Pa., USA; Inogen One Oxygen Therapy System from Inogen, Goleta, Calif., USA; and L-6 Oxygen concentrator from OxLife, Hendersonville, N.C., USA.

In the case of motorized vehicles including automobiles, trucks, and the like, the oxygen generator 13 may in one embodiment be located in the engine compartment. In other embodiments, the oxygen generator 13 is remotely located, such as in the trunk area, behind a vehicle's cab, or any other selected location. The effluent of the oxygen generator 13, which can often be essentially-pure oxygen, is fed through conventional plumbing or ducting commonly employed in the automotive arts to the air intake for the IC engine 3, and in preferred embodiments is controllably delivered thereto by means of control valves including by way of example, those such as 15, 17.

According to one embodiment, the control valves 15, 17 are solenoid-actuated valves. In an alternate embodiment, the control valves 15, 17 are vacuum-actuated. In yet other alternate embodiments, the control valves 15, 17 are actuated electrically, electromechanically, or using smart materials in mechamatronic devices. Regardless of the motive energy or method used for switching or controlling the valves employed, the control valves 15, 17 are preferably of the type which can provide for a wide range of flow rate capabilities of the effluent from the oxygen generator 13. Such valves are well-known in the automotive arts and are found in exhaust gas recirculation ("EGR") valves, to cite but one non-limiting example. Additional control over the amount of oxygen provided may be achieved by varying the voltage input to the oxygen generator 13, such as through a microprocessor of the type commonly employed in automotive applications, wherein signals from various sensors disposed at locations on the IC engine 3 are used to provide input parameters which the microprocessor uses to make decisions concerning supplemental oxygen flow to the intake manifold provided by the oxygen generator 13.

In one embodiment, one or more oxygen sensors are provided in pre-intake or post-combustion locations such as the intake manifold, the conduit 21 or at location C in FIG. 1, which is after the exhaust gas aftertreatment device 11.

In accordance with an IC engine system as provided herein, the amounts of nitrogen oxides (NOx) in the exhaust gas may be significantly reduced by providing supplemental oxygen to the intake manifold side of the IC engine 3. Although not to be construed as limiting the present disclosure in any fashion, it is theorized that a portion of this reduction of NOx may be due to the fact that less nitrogen is present in the intake air when the intake air contains enhanced levels of oxygen, as provided hereby. Additionally, increased thermodynamic efficiency of the IC engine 3 is achieved by increased combustion efficiency. For IC engines being operated using diesel fuel or gasoline as fuel, this means that the production of soot, carbon monoxide ("CO") and unburned hydrocarbons ("HC") in the exhaust gas effluent of the engine may be substantially reduced and often eliminated. In some embodiments, the NOx or HC or soot or CO content of the exhaust gas exiting an engine operated according to this disclosure is reduced by at least 50% on a molecular mass basis. In other embodiments the content of more than one of these undesirable gaseous effluent substances is so reduced. In some embodiments, the NOx or HC or soot or CO content of the exhaust gas exiting an engine operated according to this disclosure is substantially eliminated. In other embodiments the content of more than one of these substances is substantially eliminated. These reductions lessen the burden on catalytic converters and other engine exhaust effluent treatment devices and may in some cases even eliminate the need for such exhaust effluent treatment devices as catalytic converters. In embodiments where the burden on a catalytic converter is reduced, the exhaust restriction inherently associated with the use of a catalytic converter can accordingly be lessened, providing increased volumetric efficiency for a given engine. Additionally, cold-start emissions of an IC engine may be significantly reduced through enhancement of the oxygen content of the air intake charge.

Figure 2:
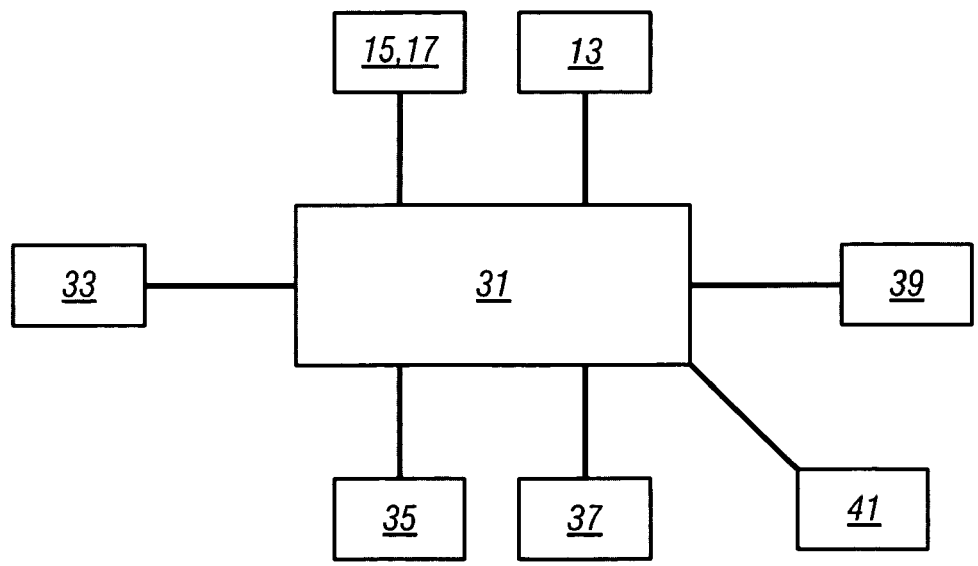
FIG. 2 shows a block diagram of a control system useful in accordance with operation of an IC engine according to certain embodiments of the disclosure.

FIG. 2 shows a block diagram of a control system useful in accordance with operation of an IC engine according to an embodiment of the disclosure. FIG. 2 illustrates a microprocessor 31, which controls the valves 15, 17, and in alternate embodiments additionally or independently controls the electrical energy inputted to the oxygen generator 13 via means of a relay or solid-state switch, such as from an electrical storage battery or electrical generation means. Engine sensors 33, 35, 37, one or more of which may be present in different embodiments, are employed to provide data to the microprocessor 31 in order to effectuate control over the amount of oxygen from the oxygen generator 13 which is delivered to the air intake side of the IC engine 3. These sensors 33, 35, 37 may be sensors including, without limitation, oxygen sensors, mass airflow sensors, manifold absolute pressure sensors, crankshaft position sensors, hydrocarbon sensors, NOx sensors, intake air mass flow sensors, engine r.p.m. sensors, knock sensors, coolant temperature sensors, oil temperature sensors, and external temperature sensors. In one embodiment, the delivery of supplemental oxygen from the oxygen generator 13 is controlled based on data provided by an oxygen sensor disposed in the conduit 21, to be the presence of a slight excess of oxygen in the engine exhaust effluent at that point, on the order of at least about 0.05% to 1%, or more, on a mass basis. Alternately, such oxygen sensor may be disposed at any location in the exhaust gas stream of the engine 3. In another embodiment, the delivery of supplemental oxygen from the oxygen generator 13 is controlled based on data provided by a knock sensor disposed in any location in, on, or near the engine block, and the oxygen content of the intake air is adjusted until no knocking is sensed for the operating conditions present at any given point in time. In another embodiment, the delivery of supplemental oxygen from the oxygen generator 13 is controlled in part based on data provided by an oxygen sensor disposed in the intake manifold 5 of the IC engine 3. In yet another embodiment, the delivery of supplemental oxygen from the oxygen generator 13 is controlled based on data provided by a NOx sensor disposed at any location in the effluent exhaust stream of the IC engine 3.

In one embodiment, in FIG. 2 the device 39 controls fuel metering, such as by fuel injectors or other fuel delivery devices, in order to adjust fuel consumption based on input gathered from other sensors, including the aforesaid, which may be present. In one embodiment, the fuel delivery is controlled to provide a less-than-stoichiometric amount of fuel to the engine (i.e. lean operation). In another embodiment, the fuel delivery is controlled to provide a stoichiometric amount of fuel to the engine. In yet another embodiment, the fuel delivery is controlled to provide a greater-than-stoichiometric amount of fuel to the engine (i.e. rich operation).

In another embodiment, control device 41 present in a system according to the disclosure, which control device 41 is an exhaust gas recirculation valve, is controlled by the microprocessor 31 to result in amounts of exhaust gas recirculation which effect the least amount of NOx in the engine's exhaust effluent as sensed by a NOx sensor that is disposed at any desired location in the effluent exhaust stream for given operating conditions of the IC engine 3.

A system 10 as provided hereby can be retrofitted to existing engines and motorized vehicles containing same, since the goals of current design of microprocessor-controlled engines is typically in line with that achieved by supplementing the intake air with oxygen according to this disclosure. Thus, for example, a supercharger may be displaced and an oxygen generator 13 substantially substituted in its stead, and the means for controlling the boost pressure on the former supercharger can instead control the valve 15, 17, or in alternate embodiments the operational energy to the oxygen generator 13, to afford effective control over the oxygen content of the intake charge, thus eliminating the supercharger while retaining the essentially the same benefits thereof without the shortfalls associated with boosted intake pressures. In some embodiments of this disclosure, oxygen from the oxygen generator 13 is delivered only under full-throttle or near full-throttle conditions, such as 80% full-throttle or greater as measured by airflow through a throttle body.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system useful for operating an internal combustion engine, said system comprising:
an internal combustion engine having an intake manifold and an exhaust manifold;
an oxygen generator having an oxygen effluent, said oxygen generator comprising molecular sieves as a functional component; and a knock sensor disposed near an engine block of said engine providing knock data, wherein an amount of said oxygen effluent from said oxygen generator is controllably delivered to said intake manifold by varying an electrical energy input to the oxygen generator, said amount of said oxygen effluent is further controlled based on said knock data provided by the knock sensor.

2. A system according to claim 1 wherein said oxygen generator utilizes pressure swing adsorption.

3. A system according to claim 1 wherein said oxygen generator and said internal combustion engine are both disposed on-board of a motorized vehicle selected from the group consisting of: automobiles, trucks, earth-moving equipment, and watercraft.

4. A system useful for operating an internal combustion engine, said system comprising:
an internal combustion engine having an intake manifold and an exhaust manifold;
a controller;
a plurality of sensors signally coupled to said controller, said plurality of sensors being variously and effectively disposed within the intake manifold, an exhaust gas feedstream of said engine and near an engine block of said engine to gather engine operating parameter data, and
an oxygen generator having an oxygen effluent, said oxygen generator comprising molecular sieves as a functional component,
wherein an amount of said oxygen effluent from said oxygen generator is controllably delivered to said intake manifold by varying an electrical energy input to the oxygen generator, said gathered engine operating parameter data provided by at least one of said plurality of sensors effectuating control over said amount of said oxygen effluent from the oxygen generator.

5. A system according to claim 4, wherein said electrical energy input is controllably provided to said oxygen generator by said controller.

6. A system according to claim 4 wherein said oxygen effluent of said oxygen generator is directed to said intake manifold through a conduit comprising a control valve disposed therein, said control valve being controlled by said controller.

7. A system according to claim 4 wherein said oxygen generator and said internal combustion engine are both disposed on-board of a motorized vehicles elected from the group consisting of: automobiles, trucks, earth-moving equipment, and watercraft.

8. A system according to claim 4 wherein the quantity of oxygen provided by said oxygen generator is controlled by said controller.

9. A method for operating an internal combustion engine comprising:
providing a system comprising:
an internal combustion engine having an intake manifold and an exhaust manifold,
a controller,
a plurality of sensors signally coupled to said controller, said plurality of sensors being variously and effectively disposed within the intake manifold, an exhaust gas feedstream of said engine and near an engine block of said engine to gather engine operating parameter data,
an oxygen generator having an oxygen effluent, said oxygen generator comprising molecular sieves as a functional component, an amount of said oxygen effluent of said oxygen generator being controllably delivered to said intake manifold by varying an electrical energy input to the oxygen generator; and
starting and operating said engine;
wherein the amount of oxygen provided by said oxygen generator to said intake manifold is further controlled by said controller to be an effective amount of supplemental oxygen to beneficially modify the chemical composition of gases which exit said exhaust manifold during engine operation, said gathered engine operating parameter data provided by at least one of said plurality of sensors effectuating control over said amount of said oxygen effluent from the oxygen generator.

10. A method according to claim 9 wherein the total unburned hydrocarbon content of the gases exiting said exhaust manifold during engine operation is reduced by at least 50% on a mass basis as a result of oxygen provided to said intake manifold by said oxygen generator, compared to the situation wherein oxygen from said oxygen generator is not so provided.

11. A method according to claim 9 wherein the total unburned hydrocarbon content of the gases exiting said exhaust manifold during engine operation is substantially eliminated as a result of oxygen provided to said intake manifold by said oxygen generator, compared to the situation wherein oxygen from said oxygen generator is not so provided.

12. A method according to claim 9 wherein the total nitrogen oxides content of the gases exiting said exhaust manifold during engine operation is reduced by at least 50% on a mass basis as a result of oxygen provided to said intake manifold by said oxygen generator, compared to the situation wherein oxygen from said oxygen generator is not so provided.

13. A method according to claim 9 wherein the nitrogen oxides content of the gases exiting said exhaust manifold during engine operation is substantially eliminated as a result of oxygen provided to said intake manifold by said oxygen generator, compared to the situation wherein oxygen from said oxygen generator is not so provided.

14. A method according to claim 9 wherein the total carbon monoxide content of the gases exiting said exhaust manifold during engine operation is reduced by at least 50% on a mass basis as a result of oxygen provided to said intake manifold by said oxygen generator, compared to the situation wherein oxygen from said oxygen generator is not so provided.

15. A method according to claim 9 wherein the total carbon monoxide content of the gases exiting said exhaust manifold during engine operation is substantially eliminated as a result of oxygen provided to said intake manifold by said oxygen generator, compared to the situation wherein oxygen from said oxygen generator is not so provided.

16. A method according to claim 9 wherein said oxygen generator and said internal combustion engine are both disposed on-board of a motorized vehicle selected from the group consisting of: automobiles, trucks, earth-moving equipment, and watercraft.

17. A method according to claim 9 wherein the total soot content of the gases exiting said exhaust manifold during engine operation is reduced by at least 50% on a mass basis as a result of oxygen provided to said intake manifold by said oxygen generator, compared to the situation wherein oxygen from said oxygen generator is not so provided.

18. A method according to claim 9 wherein the total soot content of the gases exiting said exhaust manifold during engine operation is substantially eliminated as a result of oxygen provided to said intake manifold by said oxygen generator, compared to the situation wherein oxygen from said oxygen generator is not so provided.

19. A method according to claim 9, further comprising:

providing an effective amount of exhaust gas recirculation to reduce combustion chamber temperatures of said internal combustion engine during its operation.

20. A method according to claim 9 wherein the oxygen content of the gases exiting said internal combustion engine is any amount between about 0.001% and about 1% on a molecular mass basis, including all percentages and ranges of percentages therebetween.

21. A method according to claim 9 wherein said internal combustion engine is fed at least one fuel selected from the group consisting of: gasoline, diesel fuel, methanol, ethanol, and C1 to C4 esters of fatty acids (biodiesel), including any mixtures of the foregoing.

* * * * *